Nov. 30, 1943.   J. F. JEHLE   2,335,515
CUTTING METHOD AND APPARATUS
Filed June 11, 1940   3 Sheets-Sheet 1
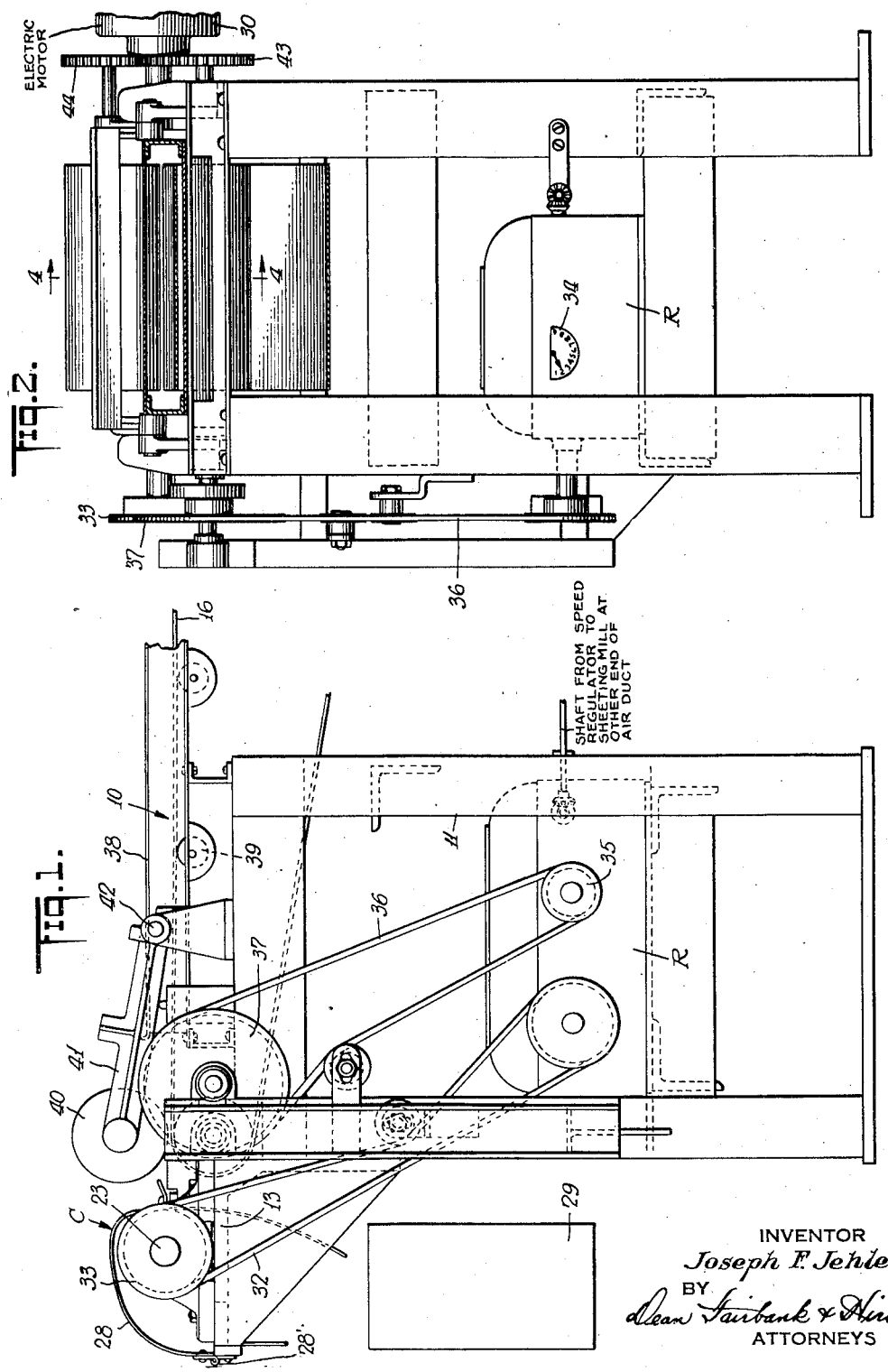
INVENTOR
Joseph F. Jehle
BY
Dean Fairbank & Hirsch
ATTORNEYS

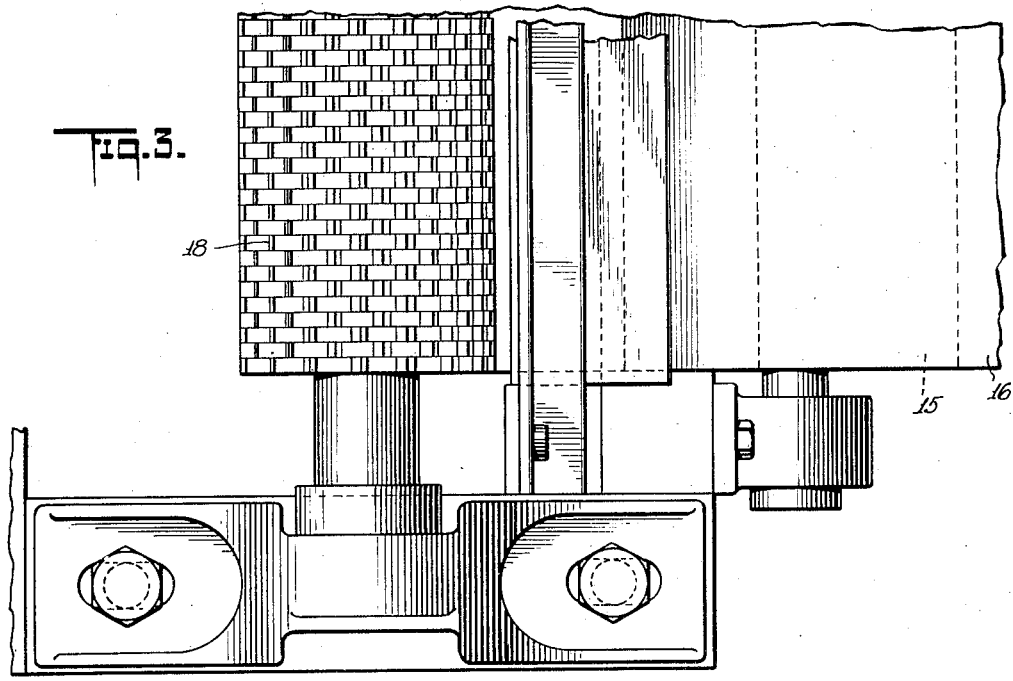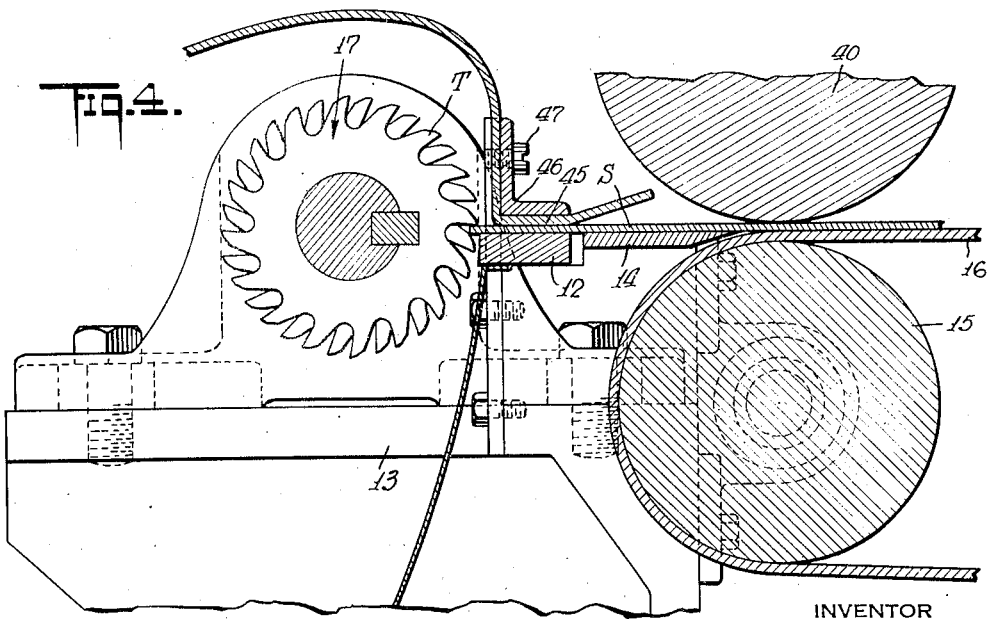

Nov. 30, 1943.    J. F. JEHLE    2,335,515
CUTTING METHOD AND APPARATUS
Filed June 11, 1940    3 Sheets-Sheet 3
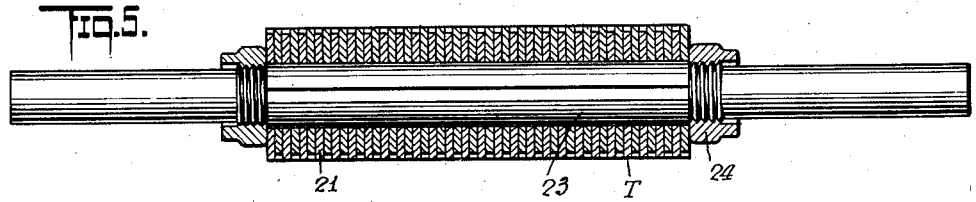
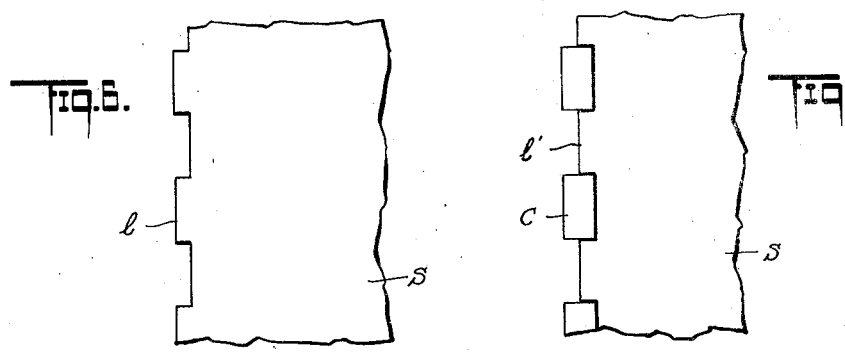
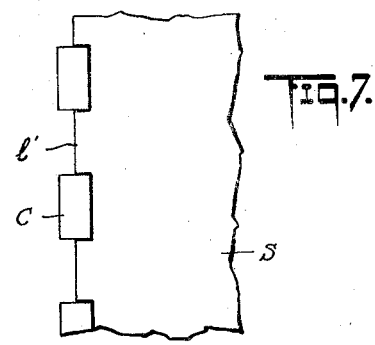
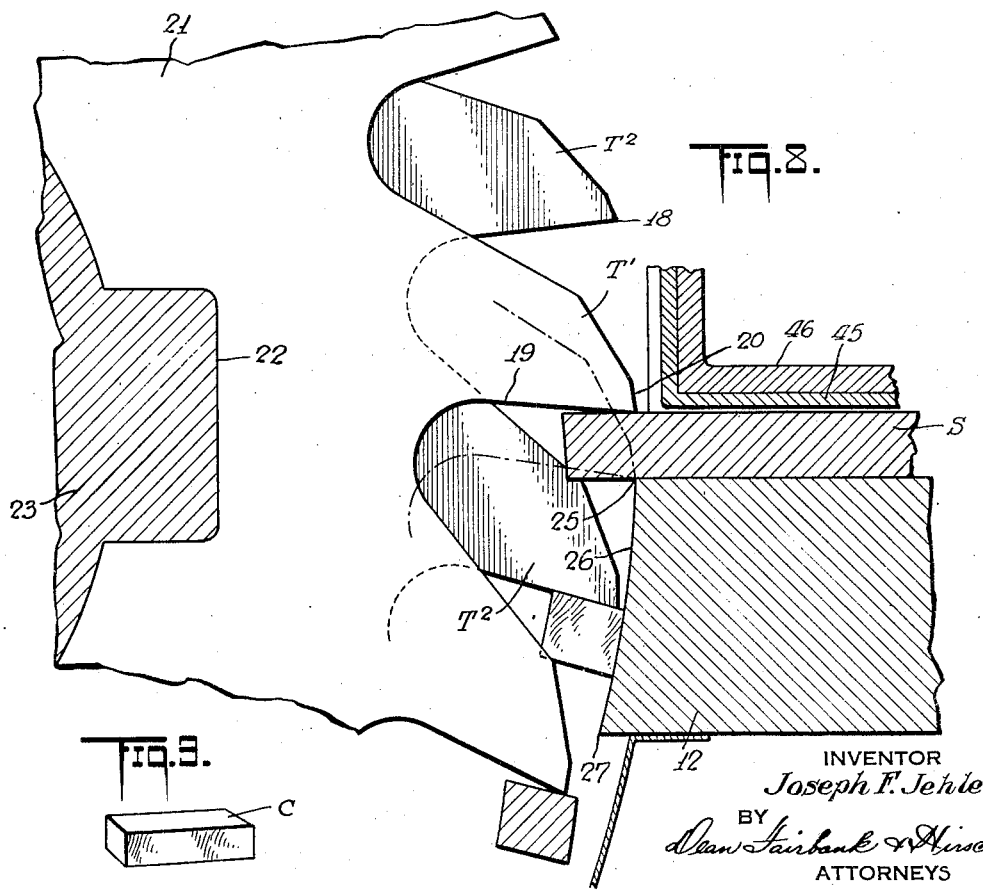
INVENTOR
Joseph F. Jehle
BY
ATTORNEYS Patented Nov. 30, 1943

2,335,515

UNITED STATES PATENT OFFICE 2,335,515

CUTTING METHOD AND APPARATUS

Joseph F. Jehle, Lyndhurst, N. J., assignor to Condor Solvents Inc., Lyndhurst, N. J., a corporation of Delaware Application June 11, 1940, Serial No. 339,899

12 Claims. (Cl. 83—6)

While the present invention is more particularly concerned with the sub-division of sheets of thermo-plastic molding composition into chips of size suitable for impact molding, the invention in certain of its aspects is applicable to the sub-division of relatively stiff sheets of material for other purposes.

As conducive to a clear understanding of the invention, it is noted that in sub-dividing sheets of thermo-plastic molding compound by chipping or grinding, so much frictional heat is apt to be generated as to render the stock plastic and to cause the particles to coalesce, unless the stock after having been passed through the sheeting mill in the course of preparation thereof has first been thoroughly cooled. Moreover, the shipping or grinding operation generally results in gravel-like chips of wide variety of sizes, mingled with dust or powder. The use of such non-uniform particles in impact molding involves difficulty due to the differences in the rate of softening of particles of various sizes, and the venting from the mold of the varying amounts of air entrapped, which difficulty is only partly obviated by screening operation, that in turn, involves further cost for equipment and labor as well as loss of material.

It is among the objects of the invention to provide methods and simple, inexpensive and automatic apparatus for executing the same, by which thermo-plastic molding compound delivered from the sheeting mill may be sub-divided expeditiously and continuously without the loss of time incurred in storage for thorough cooling and with a minimum of service or of supervision, without fouling or packing the apparatus by conglomeration of plastic material, and by which the chips are produced of the uniform size desirable for impact molding and without the need for grading or screening the chips.

In the accompanying drawings in which is shown one of various possible embodiments of the several features of the invention, Fig. 1 is a side elevation of a machine for carrying out the invention, Fig. 2 is an end elevation of said machine, Fig. 3 is a fragmentary plan view on a larger scale showing the cutting mechanism, Fig. 4 is a transverse sectional view on a larger scale taken on line 4—4 of Fig. 2, Fig. 5 is a longitudinal sectional view showing the rotary cutter unit, Fig. 6 is a fragmentary plan view showing the first step in the shearing cycle, Fig. 7 is a similar view showing the second step in said cycle, Fig. 8 is a fragmentary view on a greatly enlarged scale showing the shearing or cutting operation, and Fig. 9 is a perspective view of one of the chips produced according to the invention.

In the drawings, there is shown an installation particularly desirable for sub-dividing sheets of thermo-plastic molding compound such as cellulose acetate, polystyrene, methacrylate and vinyl resins used for impact molding. The ingredients of the molding compound after being thoroughly intermixed to form a dough are passed through a conventional sheeting mill (not shown) which they leave as hot sheets.

According to the invention the sheets are passed to the sheet cutting instrumentality generally shown in Figs. 1 and 2 by means of a conveyor 10 supported upon frame 11 of the machine. The successive sheets leaving the conveyor are sub-divided by the cutting unit C at the front of the machine.

The cutting unit, the details of which are shown in one embodiment in Figs. 3 to 5 and 8, comprises a metal shear plate 12 of either soft or hardened steel mounted upon bed 13 of the machine and plate 12 is at the forward portion of the conveyor. The conveyor passes the sheet S to be sub-divided over a fixed guide strip 14 immediately behind shear plate 12 and adjacent the forward roller 15 of the conveyor belt 16.

There coacts with the fixed shear plate 12 a movable cutter 17, desirably a rotary cutter and preferably of the construction now to be described. The rotary cutter desirably is cylindrical in shape and has uniformly spaced teeth T with sharp forward cutting edges or blades 18 at a uniform distance from the axis thereof. The cutting teeth extend in a uniform pattern as shown along and about the cylindrical cutter and preferably over the entire surface thereof. The forward cutting edges of the teeth as shown are desirably uniform in face and extend longitudinally of the cylinder. As shown, the cutting teeth of consecutive tiers are staggered with respect to each other, so that, as indicated in Fig. 8, the teeth $T^2$ of the second tier trail with respect to teeth $T'$ of the first tier. While the teeth may be arranged in a multiplicity of sets of tiers, it is preferable and sufficient for all practical purposes to have two such sets of tiers. Thus, the teeth $T'$ on the first, third and fifth and other odd numbered tiers are aligned along elements of the cylinder, while the teeth $T^2$ of the intermediate or even numbered tiers, the second, fourth, sixth, etc. are likewise aligned, but are on elements of the cylinder trailing those of the neighboring teeth on the contiguous tiers and desirably the trailing teeth are on cylinder elements midway between the neighboring teeth of the contiguous tiers. Desirably, each tooth presents a relatively blunt acute angle between the advance side 19 of the tooth leading to the cutting face 18 and the nose 20 of the cutting tooth. In practice, the advance side 19 of each tooth does not extend radially of the cylinder, but as shown in the drawings, is undercut at a small angle in the order of ten degrees behind the radius to the cutting edge 18.

While the teeth could be mounted upon a cylinder separately or in longitudinal sets, or could be formed as a unitary or integral part of the cylinder, it is preferable, as shown in the drawings, to build up the cutter from a multiplicity of identical milling cutter disks 21 each having its teeth formed thereon as above described and shown. These disks are mounted and keyed to carrying shaft 23 with respect to keyways 22 so positioned on the alternate milling cutter disks as to locate the teeth of the intermediate disks in uniformly trailing relation with respect to those of the disks that flank the latter. Nuts 24 threaded upon the ends of the shaft 23 maintain the cutting disks in fixed position.

As shown in the drawings, the cylindrical locus through which the teeth travel extends nearly tangentially to the upper edge 25 of the shear plate 12, the forward edge 26 of which in turn extends along a curve which flares slightly away from the cylindrical locus of the teeth to a maximum separation in the order of .01 inch at the lower edge 27 of the shearing plate.

As shown in Figs. 4 and 8 the top of the sheet to be cut is somewhat below the center of the cutters. By that relationship the action of the cutter teeth is rendered more "greedy" than if the top of the sheet were aligned with the center of the cutters. Accordingly the teeth in their gouging action tend to draw the sheet forward in the direction in which the roller 40 (to be described below), propels it and thus contributes to the smoothness of operation, and the chattering which might occur, especially if the sheet were above the center of the cutter, is thus avoided.

Desirably the rotary cutter is protected and enclosed by a hood 28 hinged at 28' at the forward end of the machine. The rear end of this hood includes a generally horizontal flange 45 which rests directly upon the sheet S at which portion the hood is also weighted and reinforced by an angle bar 46 attached thereto by screws 47. Thus the weight of the angle bar and associated hinged hood resting or floating as it does upon the sheet adjacent the advance edge being sheared, resists upward flexing of the sheet under the impact of the cutter teeth. In the absence of this precaution the stock might become fouled between the rotary cutter and the shear plate with the tendency to link chips together in a continuous chain by webs molded as a consequence of the heat and pressure evolved in forcing the obliquely displaced material between the cutting teeth and the shear plate. Incidentally any detached rough lateral edges of the sheet would be held by the floating weight from slipping out sidewise and fouling the machine.

According to the invention, the sheet stock S to be sub-divided, is fed to the cutter at rate coordinated with the operation of the latter. For this purpose, an electric motor 30 is desirably used to operate not only the cutter C but also the sheet conveying and feed means. The motor is desirably mounted upon the platform 13 that carries the cutter and is connected to the latter by a suitable speed reduction unit (not shown) which may be built into the motor casing. A belt 32 connected to an appropriate drive wheel 33 on the cutter shaft 23 operates a speed regulator R desirably a Reeves speed regulator of conventional construction mounted upon the frame 11. Regulator R has an adjustment 34 by which is determined the driven speed of pulley 35 that operates belt 36 which in turn through pulley 37 drives the conveyor belt 16.

Belt 16 extends through an enclosed air duct 38 with channel stock sides, and rides over idler rolls 39, thereby to advance the stock forward from the sheeting mill to the cutter. Cool air is blown by suitable means (not shown) through the air duct 38 to cool the surfaces of the hot sheets passed along the conveyor. The sheet at the forward end is positively advanced toward the rotary cutter by means of a heavy toothed roller 40 resting upon the sheet, rotatably mounted on the outer end of arm 41 which is pivotally mounted at 42 upon the frame. Roller 40 is positively driven through a gear 43 driven from belt 16 and meshing with gear 44 rigid with said roller.

In operation, the row of aligned teeth T' on alternate milling disks 21 gouges or chops out of the advance overhanging edge of the stock by a shearing action, a multiplicity of the rectangular chips C shown in Figs. 7 and 9. Each chip is of length equal to the face of the cutting blades, of thickness equal to that of the sheet and of width determined by the rate of feed of the sheet. As a result of the cutting operation by one longitudinal row of cutting teeth the forward edge of the sheet has become notched at uniform intervals leaving lugs l between the notches, of width equal to the length of the chips or notches. In the continued rotation of the cutter, the teeth $T^2$ on the intermediate milling disks which are aligned with the lugs thus left in the first step of the cycle gouge out enough material preferably not only to remove the lugs, but to gouge beyond the bases of said lugs and to form notches where the lugs were, thereby leaving intervening lugs l' as best indicated in Fig. 7. Thus in operation, notches are cut at each bite, first by one set of alternate cutters then by the intermediate set of cutters, two successive bites thus constituting a complete cycle.

As best shown in Fig. 8 the protruding or overhanging advance edge of the sheet to be subdivided enters between successive rows of teeth on the cutter, that is, between the trailing side of the row of teeth $T^2$ that have completed a shearing operation and the advance side of the succeeding row of teeth T' about to perform a shearing operation. The advance edge of the teeth being undercut at 19, friction and heat evolution are minimized in the shearing operation.

Were the advance edge of the teeth to extend radially of the cutter and substantially into surface engagement with the area of the sheet to be sheared, the sheet material in its continuous feed would have a tendency to flex or buckle as it is gripped by the teeth, with the generation of heat and the coalescing of consecutive chips into a chain. In a short time the machine would, therefore, become fouled and would have to be stopped for cleaning.

The flaring of the shearing plate at 26 away from the cylindrical locus of the cutter teeth likewise minimizes friction and heat evolution in the traverse of the chips across the thickness of the shearing plate. Were the entire thickness of the shearing plate to extend close to the path of movement of the rotary cutting blades, the consequent heat evolution in passing the severed material between the shear plate and rotary cutter blades would frequently result in rendering the stock plastic and thus clogging the cutter. If the forward edge 26 of the shear plate were at right angles to its face, or if it were undercut, at a sharp angle as is customary in machine practice, that is, where the upper face of the shear plate extends at an acute angle to the forward edge of said plate, the thermoplastic material would not be separated into distinct chips in the cutting action, but the chips would hang together in a chain as they pass between the shearing cutter and the wedge-shaped gap between the points of the moving teeth and the forward edge of the stationary shear plate.

The point of each tooth, which alone engages the forward part of the sheet to be gouged has a forward component of motion in its rotation by reason of the elevated position of the cutter shaft so that the chip is moved forward by the cutter with the continuous forward movement of the sheet itself, wherefor the chips break off sharply and any web between consecutive chips that might otherwise tend to form is snapped.

Thus, by the arrangement in which the rotary teeth are under cut at their advance sides and the shearing plate flares away from the cylindrical locus of the cutter blades, the evolution of excess heat in the course of the shearing operation and the coalescing of the chips to be formed are obviated and the fouling of the cutter blades and the need for frequently stopping and cleaning the machine are all avoided. The gouging, shearing or cutting operation is not only expeditious but clean, the chips being substantially identical in dimensions, with an absence of breakage, crumbling or powdering.

In the continuous operation set forth, the air stream is effective merely to cool the upper and lower surface of the hot sheet from the sheeting mill. The core of the sheet remains warm as the sheet reaches the cutter. The rapid and smooth chopping or shearing action of the rotary cutter results in the clean cut set forth, without excessive friction or heat evolution so that the chips come off clean as set forth. Were the sheets fed in hot without being surface cooled, the operation of the cutter might result in rendering the stock plastic and in fouling or packing the composition in between the teeth of the cutter, necessitating repeated stopping of the machine for cleaning. On the other hand, if the sheets are fed in thoroughly cold throughout their thickness, the stock may be subject to breakage, chipping or cracking under the sharp impact of the rotary cutter blades and the uniformity of the product may be somewhat impaired. Thus, according to the present invention, the advantage is attained that no time need be lost in thoroughly cooling or refrigerating the stock, and the air blast cooling in the course of conveying the sheet to the cutter is all that is required, especially as the heated core contributes to the uniformity of the product when produced according to the present method.

By adjustment 34, the rate of feed of the sheet stock relatively to the rotary speed of cutter C may be regulated, and chips of greater or lesser width may be produced according to specifications.

The shearing blade under the repeated blows of the hardened cutter blades requires sharpening from time to time. While it is preferred to perform this operation according to the practice commonly resorted to with machine tools, a fairly satisfactory result may be obtained by advancing the shearing cutter slightly, so that its advance edge touches the rotary cutter, clamping the shearing plate in position and then turning the rotary cutter by hand, whereby the hard rotary blades will shave off the advance edge of the shearing plate to restore it to its original condition.

As many changes could be made in the above construction and method and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent is:

1. The method of sub-dividing thermo-plastic molding compound in sheet form into short uniform chips, which consists in surface cooling the hot sheet of said compound as delivered from the sheeting mill while the core thereof remains warm, then simultaneously gouging chips of the desired dimensions out of the advance edge of the sheet at intervals equal to the length of said chips and then simultaneously shearing off the material to at least the base of the lugs thus formed and repeating such cycle of operations.

2. The method of sub-dividing thermo-plastic molding compound in sheet form into short rectangular chips, which consists in surface cooling the hot sheet of said compound as delivered from the sheeting mill while the core thereof remains warm, then notching the sheet, to gouge chips of the desired dimensions out of the edge of the sheet at intervals equal to the length of said chips and then notching the sheet by gouging chips from the region of the lugs intervening between the notches first formed and repeating said sequence of operations.

3. The method of sub-dividing sheets of thermoplastic molding compound into short chips of predetermined uniform size, which consists in surface cooling the hot sheet of said compound as it is delivered from the sheeting mill, while the core thereof remains warm, supporting the stock with its forward end protruding, shearing said protruding edge to gouge therefrom chips of the desired dimensions thereby forming notches spaced by lug intervals of width equal to the length of said chips, and then shearing the sheet at the region of said lugs to form notches where the lugs were, while advancing the sheet into protruding relation for repetition of said two step cycle.

4. The method of sub-dividing sheets of thermo-plastic molding compound into short chips of predetermined uniform size which consists in surface cooling the hot sheet of said compound as it is delivered from the sheeting mill, while the core thereof remains warm floatingly holding the forward portion of the sheet with its forward edge protruding and gouging the chips from said edge by notching the same at intervals spaced by lugs equal in width to the length of said notches advancing the sheet with said lugs exposed and then notching the same at the region of said lugs and repeating said sequence of operations.

5. The method of sub-dividing a sheet of thermo-plastic molding compound into chips of uniform cross-section and uniform short length, which consists in surface cooling the hot rolled sheet while the core thereof remains warm, conveying the same to overhang at its forward edge and striking a succession of shearing blows at such forward edge, alternately to gouge out one set of the chips at portions spaced by the length of said chips and then to gouge out another set of chips to form notches where said lugs were.

6. A machine comprising a bed carrying thermoplastic molding compound in sheet form to be sub-divided, propelling means for positively feeding the sheet material along the bed, a fixed shearing cutter plate at the extremity of the bed and coacting movable cutter means comprising a cylinder having a pattern of teeth protruding therefrom, and movable substantially solely about the axis of said cylinder, said teeth being arranged in tiers peripherally of the cutter, alternate teeth longitudinally of the cutter being aligned, the intermediate tiers of teeth being aligned longitudinally of the cutter along elements of the cylinder between those of neighboring teeth of the respective flanking contiguous tiers of teeth, the advance side of each cutter being undercut with respect to the corresponding radius and extending at an acute angle relative to the cutting edge thereof.

7. A machine comprising a bed carrying thermoplastic molding compound in sheet form to be sub-divided, propelling means for positively feeding the sheet material along the bed, a fixed shear plate at the extremity of the bed and coacting movable cutting means comprising a rotatable cylinder retained against longitudinal displacement and having pointed cutter teeth protruding from the surface thereof in a path substantially tangential to the forward edge of the shear plate, the center of said cutter cylinder being above the top of the sheet material to be sub-divided, the advance side of each cutter being undercut with respect to the corresponding radius and extending at an acute angle relative to the cutting edge thereof said teeth being distributed over the cylinder in a regular pattern in which the teeth extend in tiers peripherally about the cylinder and are uniformly spaced, the teeth of each tier being peripherally staggered with respect to those of the contiguous tiers.

8. A machine comprising a bed carrying thermoplastic molding compound in sheet form to be sub-divided, propelling means for positively feeding the sheet material along the bed, a fixed shear plate, a cylindrical toothed cutter retained against longitudinal displacement and having teeth movable to coact with minute clearance relative to the forward upper edge of the shear plate, said cutter comprising teeth at a uniform radial distance from the axis of the cylinder, arranged in tiers with the edges of alternate tiers aligned longitudinally of the cutter and those of the intermediate teeth likewise aligned but in staggered relation with respect to the first set, the forward face of the shear plate being curved to flare away slightly from the cylindrical locus defined by the moving cutters.

9. A machine for sub-dividing a sheet of thermo-plastic compound into uniform small chips, comprising a fixed shear plate, a rotary cutter retained against longitudinal displacement and having a pattern of cutting teeth distributed over the entire surface thereof with cutting blade faces extending longitudinally of the cylindrical cutter, peripherally aligned in a multiplicity of tiers with the blades of successive tiers in peripherally stagged relation, the advance edge of each tooth being undercut with respect to the corresponding radius, the rotary cutter extending nearly tangentially of the upper edge of the shearing plate, the forward face of the shearing plate being curved to flare away slightly through its thickness with respect to the cylindrical locus of the movable cutting teeth.

10. A machine for sub-dividing a sheet of thermo-plastic compound into uniform small chips comprising a fixed shear plate, a rotary cutter retained against longitudinal displacement and having cutting teeth distributed over the entire surface thereof with cutting blade faces extending longitudinally thereof, peripherally aligned in a multiplicity of tiers with the blades of successive tiers in peripherally staggered relation, the advance edge of each tooth being undercut relative to the radius from its point, the center of said rotary cutter being above the upper surface of the sheet to be cut, the rotary cutter extending nearly tangentially of the upper edge of the shear plate, the forward face of the shear plate being curved to flare away slightly through its thickness with respect to the cylindrical locus of the movable cutting teeth.

11. A machine for sub-dividing thermo-plastic molding compound in sheet form into short uniform generally polygonal chips, said machine comprising a bed having a conveyor for hot sheets of the thermo-plastic material, means about said conveyor for enclosing the sheet material, means for conducting air through said enclosure in contact with both surfaces of the sheet material for a distance sufficient to effect surface cooling thereof while the core of the sheet remains warm, a feeding roll for advancing the sheet beyond the forward end of the conveyor, a shear plate adjacent to said roller, a rotatable shearing cutter having a multiplicity of teeth in staggered relation and coacting with the advance edge of the sheet and means for positively driving said movable cutter and said feed roll.

12. A machine for sub-dividing thermo-plastic molding compound in sheet form into uniform rectangular chips of fixed length, said machine comprising a bed having a conveyor thereon for feeding the sheet material as delivered hot from the sheeting mill, means about said conveyor for enclosing the sheet material, means for conducting air through said enclosure in contact with both surfaces of the sheet material for a distance sufficient to effect surface cooling thereof while the core of the sheet material remains warm, a fixed shear plate at the forward end of said bed, a toothed rotary cutter retained against longitudinal displacement and coacting with said shear plate and moving free from contact but nearly tangentially with the forward upper edge of the shear plate, a roller in back of the shear plate for feeding the stock to be sub-divided, a power source, transmission means from said power source for driving said cutter, said feed roller and said conveyor at coordinated speeds.

JOSEPH F. JEHLE.